United States Patent
Liu et al.

(10) Patent No.: US 9,264,870 B2
(45) Date of Patent: Feb. 16, 2016

(54) MOBILE TERMINAL, SERVER AND CALLING METHOD BASED ON CLOUD CONTACT LIST

(71) Applicant: Xiaomi Inc., Beijing (CN)

(72) Inventors: Yuxiang Liu, Beijing (CN); Shangmingxue Kang, Beijing (CN); Meng Xu, Beijing (CN); Zhongliang Qiao, Beijing (CN); Botian Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/141,491

(22) Filed: Dec. 27, 2013

(65) Prior Publication Data

US 2014/0302828 A1 Oct. 9, 2014

Related U.S. Application Data

(63) Continuation-in-part of application No. PCT/CN2013/085890, filed on Oct. 24, 2013.

(30) Foreign Application Priority Data

Apr. 8, 2013 (CN) .......................... 2013 1 0120268

(51) Int. Cl.
  *H04M 3/42* (2006.01)
  *H04W 4/16* (2009.01)
(52) U.S. Cl.
  CPC ....................................... *H04W 4/16* (2013.01)
(58) Field of Classification Search
  CPC ..................................................... H04W 4/16
  USPC .................. 455/566, 418, 410–417, 567; 379/88.21, 88.23, 142.01–142.18
  See application file for complete search history.

(56) References Cited

U.S. PATENT DOCUMENTS

| | | | | |
|---|---|---|---|---|
| 8,626,137 | B1 * | 1/2014 | Devitt et al. | 455/415 |
| 2010/0203874 | A1 * | 8/2010 | Scott et al. | 455/415 |
| 2014/0173515 | A1 * | 6/2014 | Efrati et al. | 715/811 |

FOREIGN PATENT DOCUMENTS

| | | |
|---|---|---|
| CN | 101707812 A | 5/2010 |
| CN | 101765075 A | 6/2010 |

(Continued)

OTHER PUBLICATIONS

International Search Report for PCT/CN2013/085890.

*Primary Examiner* — Babar Sarwar
(74) *Attorney, Agent, or Firm* — Jun He Law Offices P.C.; James J. Zhu

(57) ABSTRACT

The present disclosure relates to a mobile terminal, a server and a calling method based on a cloud contact list. The method comprises: obtaining number information of a calling party according to a calling request from the calling party; sending an inquiry request to a cloud contact list server according to the number information of the calling party; receiving contact information corresponding to the number information of the calling party from the cloud contact list server; and displaying the contact information. When a cold call is received from an unknown number, the mobile terminal, server and calling method based on the cloud contact list provided in the present disclosure may obtain the contact information corresponding to the number from the cloud contact list, and then display the contact information to the user. In this way, the user can get to know the contact information associated with the unknown number.

10 Claims, 8 Drawing Sheets

(56) References Cited

FOREIGN PATENT DOCUMENTS

| | | |
|---|---|---|
| CN | 101827147 A | 9/2010 |
| CN | 102316203 A | 1/2012 |
| CN | 102413169 A | 4/2012 |
| CN | 102665014 A | 9/2012 |
| CN | 102811202 A | 12/2012 |
| CN | 102882851 A | 1/2013 |
| CN | 102970362 A | 3/2013 |
| CN | 103220391 A | 7/2013 |
| EP | 2144478 A1 | 1/2010 |

* cited by examiner

MOBILE TERMINAL, SERVER AND CALLING METHOD BASED ON CLOUD CONTACT LIST

CROSS-REFERENCE TO RELATED APPLICATIONS

This application is a Continuation-In-Part of International Application PCT/CN2013/085890, filed Oct. 24, 2013, which is based upon and claims the benefit of priority from the prior Chinese Patent Application No. 201310120268.4, filed on Apr. 8, 2013, the entire contents of which are incorporated herein by reference.

TECHNICAL FIELD

The present disclosure relates to mobile communication technology, especially to a cloud contact list for mobile communication, and more particularly, to a mobile terminal, a server and a calling method based on the cloud contact list.

BACKGROUND

Along with proposals of the concept of cloud technology, the development of network communication technologies based on cloud computing mode applications are under continuous growth. Information technology, integration technology, management platform technology, application technology and the like can be used to form a resource pool in the cloud, which can be used when needed, therefore, is flexible and convenient to the user.

Nowadays, with the increasing popularity of mobile phones, the mobile phones are becoming widely used, which eliminates the needs of using corded phones for some people. When using mobile phones in one's daily life, many phone calls or short messages may come from unknown phone numbers. The calls from the unknown numbers may include solicitation or harassing calls that are advertisements in nature, and may include other very important calls that may not be missed.

SUMMARY

The embodiments of the present disclosure provide mobile terminals, servers and calling methods based on a cloud contact list to identify cold calls from unknown numbers.

In one aspect, the present disclosure provide a calling method based on a cloud contact list, wherein the method comprises: obtaining number information of a calling party according to a calling request from the calling party; sending an inquiry request to a cloud contact list server according to the number information of the calling party; receiving contact information corresponding to the number information of the calling party from the cloud contact list server; and displaying the contact information.

In another aspect, the present disclosure also provides a mobile terminal based on a cloud contact list, wherein the device comprises: a processor; and a memory coupled to the processor; wherein the processor is configured to execute steps comprising: obtaining number information of a calling party according to a calling request from the calling party; sending an inquiry request to a cloud contact list server according to the number information of the calling party; receiving contact information corresponding to the number information of the calling party from the cloud contact list server; and displaying the contact information.

In another aspect, the present disclosure also provides a calling method, wherein the method comprises: obtaining number information of a calling party according to a calling request from the calling party; obtaining contact information of the calling party according to the number information of the calling party; and connecting a called party according to the calling request, and sending the contact information of the calling party to the called party.

In another aspect, the present disclosure also provides a server, wherein the server comprises: a processor; and a memory coupled to the processor; wherein the processor is configured to execute steps comprising: obtaining number information of a calling party according to a calling request from the calling party; obtaining contact information of the calling party according to the number information of the calling party; and connecting a called party according to the calling request, and sending the contact information of the calling party to the called party.

In another aspect, the present disclosure also provides a non-transitory computer readable recording medium including instructions, executable by one or more processor in a mobile terminal, for performing a calling method comprising: obtaining number information of a calling party according to a calling request from the calling party; sending an inquiry request to a cloud contact list server according to the number information of the calling party; receiving contact information corresponding to the number information of the calling party from the cloud contact list server; and displaying the contact information.

In another aspect, the present disclosure also provides a non-transitory computer readable recording medium including instructions, executable by one or more processors in a server, for performing a calling method comprising: obtaining number information of a calling party according to a calling request from the calling party; obtaining contact information of the calling party according to the number information of the calling party; and connecting a called party according to the calling request, and sending the contact information of the calling party to the called party.

It is understood that the above general description and the following detailed description are only exemplary, and not to limit the present disclosure.

BRIEF DESCRIPTION OF THE DRAWINGS

The accompanying drawings described herewith are used for further understanding the present disclosure, which compose a part of the present application, but not limit the present disclosure, wherein.

Specific embodiments of the present disclosure have been illustrated in conjunction with the accompanying drawings, and will be further described in detail hereafter. The accompanying drawings and the texts are not used to limit the scope conceived by the present disclosure in any way, but to illustrate the concepts of the present disclosure for those skilled in the art by referring to those specific embodiments by them.

DETAILED DESCRIPTION

The above and other features, technical solutions and advantages of the present disclosure will become more apparent from the following detailed description of the present disclosure given in conjunction with the following embodiments and the accompanying drawings. The exemplary embodiments of the present disclosure herein are used to illustrate the present disclosure, and not intend to limit the present disclosure.

The embodiments of the present disclosure provide mobile terminals, servers and calling methods based on a cloud contact list, which will be described in detail in conjunction with the accompanying drawings.

Figure 1:
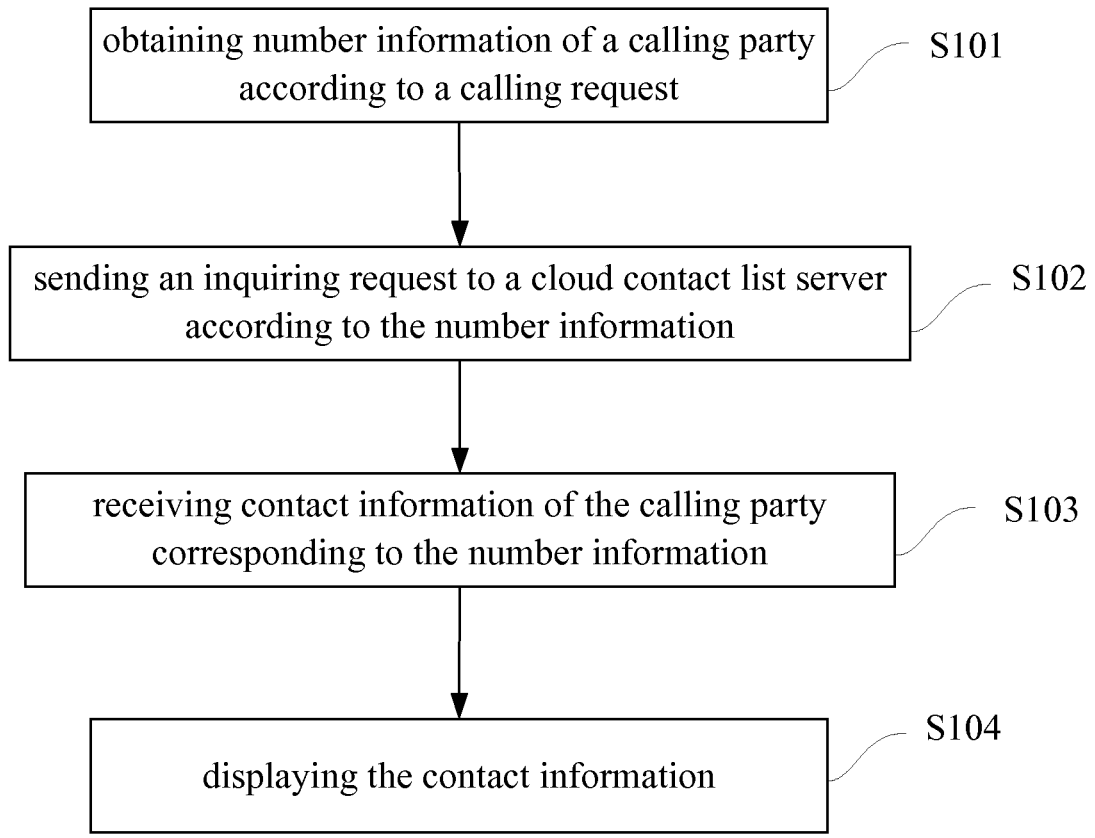
FIG. 1 is an exemplary flow chart showing a calling method based on a cloud contact list according to an embodiment of the present disclosure.

FIG. 1 is an exemplary flow chart showing a calling method based on a cloud contact list according to an embodiment of the present disclosure.

The calling method starts at step S101, wherein number information of a calling party is obtained according to a calling request from the calling party. In some exemplary embodiments, the number information includes phone number information.

In an embodiment of the present disclosure, the calling method based on the cloud contact list may be implemented by a mobile terminal such as a mobile phone. The mobile terminal may obtain, when receiving the calling request, the number information of the calling party according to the calling request.

In an embodiment of the present disclosure, the mobile terminal may first determine whether the mobile terminal locally stores contact information corresponding to the number information of the calling party by searching in a local contact list, after obtaining the number information. That is, the mobile terminal may determine whether the phone number of the calling party is stored in the local contact list. The contact list may include a plurality of contact list entries, each of which relates a contact with his/her related information, such as the number information and contact information of the contact. The contact information may include occupation classification information, address information, mailing information, work information and so on. In certain embodiments, the local contact list may be stored in a memory of the mobile terminal such as a flash memory, in an external memory card attached to the mobile terminal, or in a subscriber identity module (SIM) card inserted in the mobile terminal. If the contact information corresponding to the number information of the calling party is stored in the local contact list, the mobile terminal may directly display the contact information. However, if there is not any contact information corresponding to the number information of the calling party stored in the local contact list, the calling method proceeds with step S102.

At step S102, an inquiry request is sent to a cloud contact list server according to the number information of the calling party.

In an embodiment of the present disclosure, if the mobile terminal finds that no contact information corresponding to the number information of the calling party can be obtained after searching in the local contact list, the number information of the calling party is determined as an unknown number. The mobile terminal then launches the inquiry request and sends the inquiry request to the cloud contact list server in which the cloud contact list is stored via a network, to search for the contact information related to the unknown number.

At step S103, the mobile terminal receives the contact information corresponding to the number information of the calling party, which may be sent from the cloud contact list server.

In an embodiment of the present disclosure, after receiving the inquiry request for the unknown number, the cloud contact list server searches in its cloud contact list for the contact information corresponding to the unknown number, and then sends the obtained contact information to the mobile terminal. In certain embodiments, the cloud contact list may also include a plurality of contact list entries that associate people with their information similar to the local contact list. The format of the contact list entries of the cloud contact list may be the same or different from that of the local contact list. In certain embodiments, the cloud contact list server may further include a format converter for converting the formats of different contact list entries, to make the calling method compatible with different mobile terminals using different applications or software systems.

In certain embodiments, the contact information may be the occupation classification information associated with the number information of the calling party, i.e. a brief job description of the calling party. The occupation classification may include: headhunter, insurance salesman, salesman, fraudster, food courier, express courier and so on. The contact information may be collected and classified by the cloud contact list server. For example, for number A, if many users of the server provide feedbacks that the number is used by a calling party executing telephone fraud, the contact information for number A stored in the cloud contact list server may be provided as "a possible fraud phone number". Moreover, for number B, if many people, e.g. over 1000 people, feed back that number B is a phone number used by a courier, then the contact information for number B stored in the cloud contact list server may be provided as "courier number marked by 1000 people".

At step S104, the contact information is displayed in the mobile terminal.

In an embodiment of the present disclosure, after receiving the contact information sent by the cloud contact list server, the mobile terminal displays the contact information through its display unit, thereby the user of the mobile terminal can see the contact information of the unknown call number. For example, regarding the foregoing number A and number B, the mobile terminal may display the following contact information "a possible fraud phone call" and "a courier phone number marked by 1000 persons", respectively.

In an embodiment of the present disclosure, the mobile terminal may not only display the contact information while receiving the calling request via a phone call application, for example, but may also display the previously received contact information in a call list after the call conversation.

The method based on the cloud contact list provided in the embodiments of the present disclosure may obtain the contact information corresponding to various phone numbers in the cloud contact list server when receiving cold calls from unknown numbers, and then display the contact information to the user. Thus, the users can know the contact information of the unknown call number.

Figure 2:
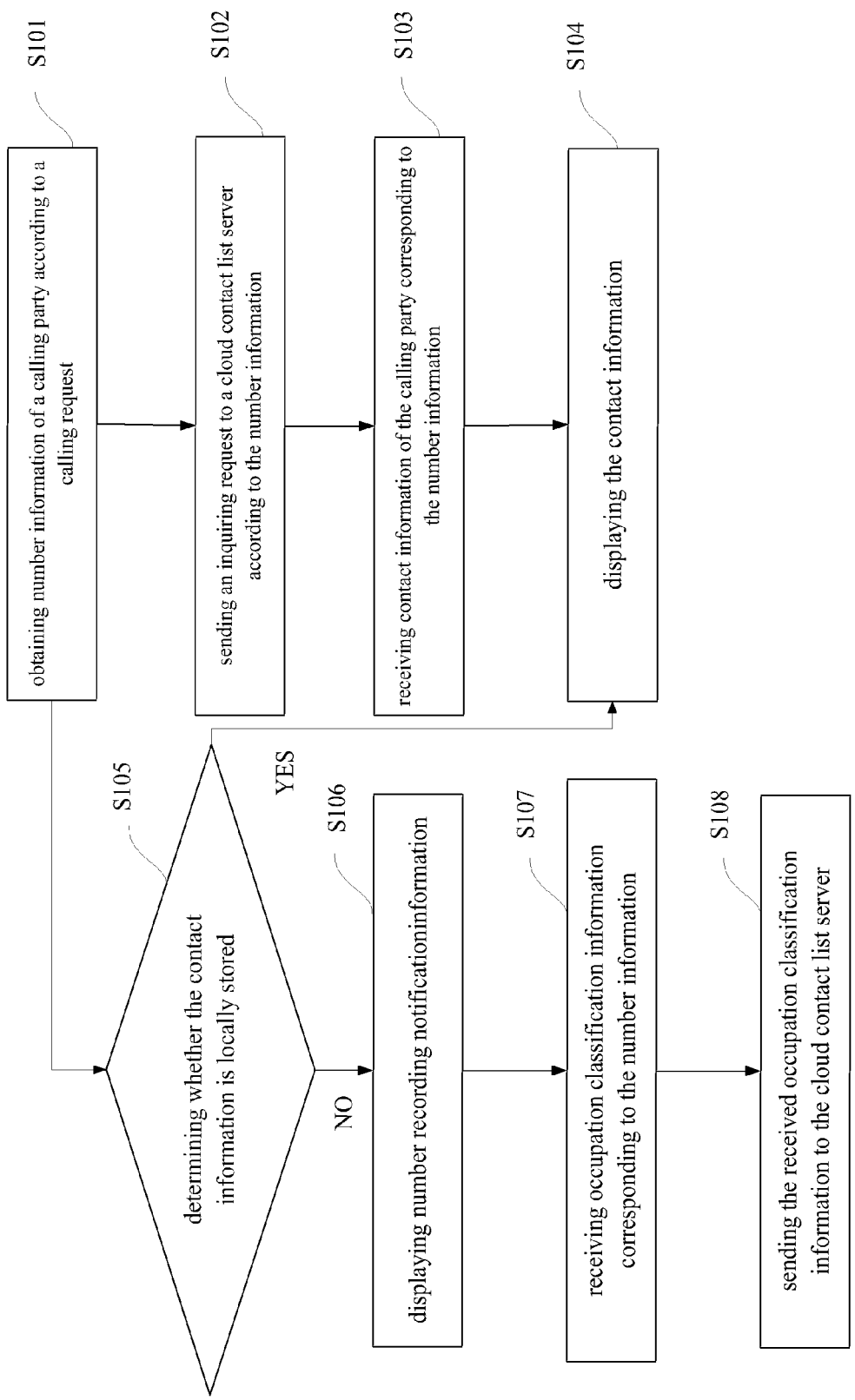
FIG. 2 is an exemplary flow chart showing a calling method based on a cloud contact list according to an embodiment of the present disclosure.

FIG. 2 is an exemplary flow chart showing a calling method based on a cloud contact list according to an embodiment of the present disclosure. As shown in FIG. 2, the method includes Steps S101-S104 as described in the embodiment with reference to FIG. 1. The method further includes steps described below.

At step S105, the mobile terminal determines whether the contact information corresponding to the number information of the calling party is locally stored.

In an embodiment of the present disclosure, the number information of the calling party may be obtained according to the calling request from the calling party. The mobile terminal may determine whether the contact information corresponding to the number information of the calling party is locally stored, i.e., whether the number of the calling party is stored in its local contact list. If the contact information corresponding to the number information of the calling party is stored in the local contact list, the mobile terminal may directly display the contact information. However, if no contact information corresponding to the number information of the calling party is locally stored, then the method may proceed with step S106 after the call conversation.

At step S106, the mobile terminal displays number recording notification if no contact information corresponding to the number information of the calling party is locally stored.

In an embodiment of the present disclosure, after the mobile terminal determines that the number of the calling party is an unknown number, i.e. not locally stored, the mobile terminal may display a number recording notification page having two buttons. For example, the number recording notification page may be displayed after the call conversation initiated by the calling request is finished. The two buttons are used to notify the user to store the unknown number in the local contact list or to mark it in the cloud contact list, respectively.

At step S107, the mobile terminal receives occupation classification information corresponding to the number information of the calling party from a user, for example, input by the user.

In an embodiment of the present disclosure, after the mobile terminal displays the number recording notification, the user may mark the unknown number by inputting information according to the call conservation with the calling party. The mobile terminal then receives the occupation classification information corresponding to the unknown number, such as headhunter, insurance salesman, salesman, fraudster, food courier, express courier and so on.

At step S108, the mobile terminal sends the received occupation classification information to the cloud contact list server. In certain embodiments, the cloud contact list server may store a cloud contact list having a plurality of contact list entries. The server may update a contact list entry or add a new contact list entry according to the received occupation classification information.

The method based on the cloud contact list provided in the embodiments of the present disclosure may display notification information to notify the user to mark the unknown call number, and to upload the marked result to the cloud contact list server. Therefore, the cloud contact list server may obtain the contact information uploaded by various users.

Figure 3:
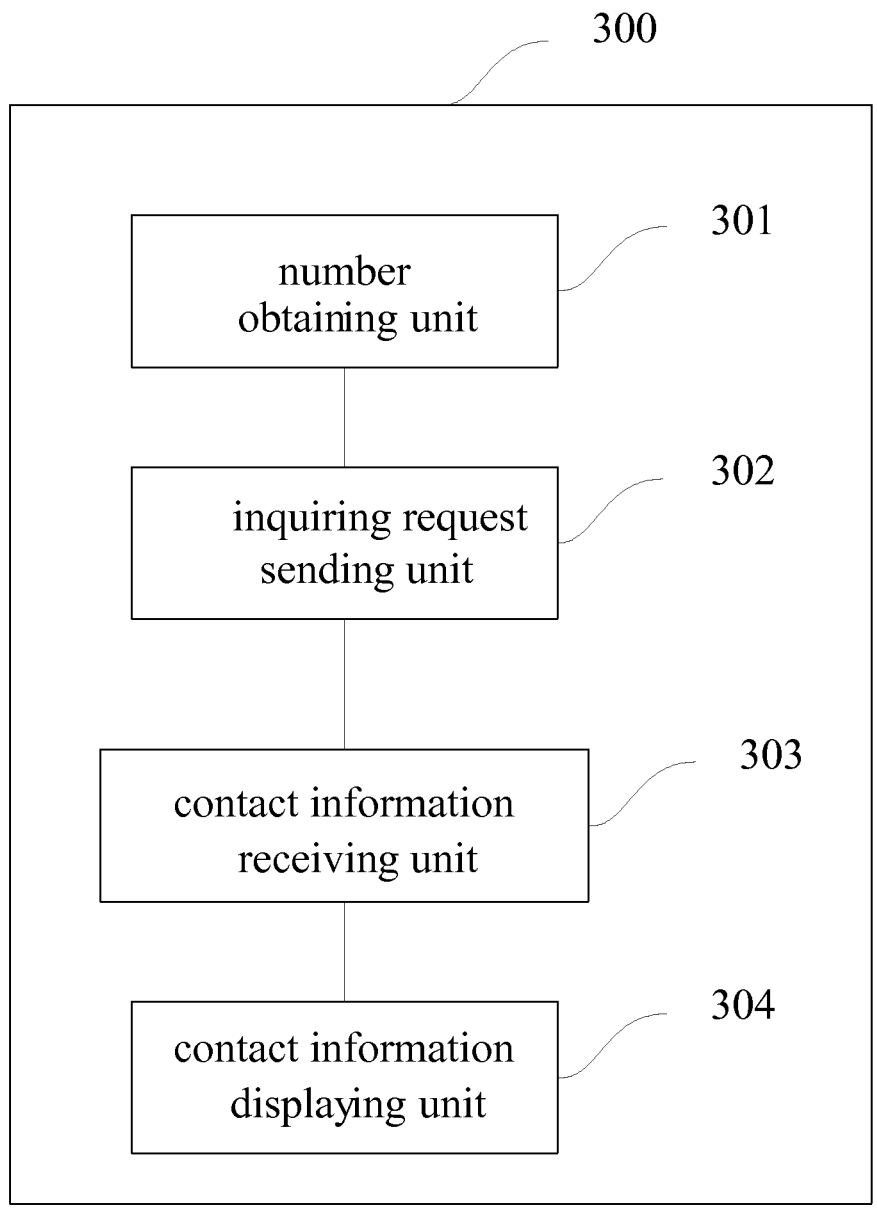
FIG. 3 is an exemplary block diagram showing a mobile terminal based on a cloud contact list according to an embodiment of the present disclosure.

FIG. 3 is an exemplary block diagram showing a calling device based on a cloud contact list according to an embodiment of the present disclosure. As shown in FIG. 3, the calling device 300 includes a number obtaining unit 301, a request sending unit 302, a contact information receiving unit 303 and a contact information displaying unit 304.

The number obtaining unit 301 is configured to obtain number information of a calling party according to a calling request from the calling party.

In an embodiment of the present disclosure, the calling device based on the cloud contact list may be provided in a mobile terminal such as a mobile phone. The number obtaining unit 301 may obtain the information related to the number of the calling party according to the calling request when the mobile terminal receives the calling request.

In an embodiment of the present disclosure, after the number obtaining unit 301 obtains the number information of the calling party, the mobile terminal may first determine whether contact information corresponding to the number information of the calling party is locally stored, i.e., whether the caller number is stored in the local contact list. If the contact information corresponding to the number information of the calling party is stored in the local contact list, the contact information displaying unit 304 may directly display the contact information. However, if the contact information is not locally stored, the mobile terminal may request such information from the cloud via the inquiry request sending unit 302.

The inquiry request sending unit 302 is configured to send an inquiry request to a cloud contact list server according to the number information of the calling party.

In an embodiment of the present disclosure, if it is found that no contact information corresponding to the number information of the calling party can be obtained after searching in the local contact list, then the number of the calling party is determined as an unknown number. Then the inquiry request sending unit 302 sends the inquiry request generated by the mobile terminal to the cloud contact list server in which the cloud contact list is stored via a network, to search for the contact information related to the unknown number.

The contact information receiving unit 303 is configured to receive the contact information corresponding to the number information of the calling party, which may be sent from the cloud contact list server.

In an embodiment of the present disclosure, after receiving the inquiry request for the unknown number, the cloud contact list server searches in its cloud contact list for the contact information corresponding to the unknown number, and then sends the obtained contact information to the contact information receiving unit 303.

In certain embodiments, the contact information may be the occupation classification information associated with the number information of the calling party, i.e. a brief job description of the calling party. The occupation classification may include: headhunter, insurance salesman, salesman, fraudster, food courier, express courier and so on. The contact information may be collected and classified by the cloud contact list server. For example, for number A, if many users provide feedbacks that the number is used by a calling party executing telephone fraud, the contact information for number A stored in the cloud contact list server may be provided as "a possible fraud phone number". Moreover, for number B, if a lot of people, such as 1000 people feed back that number B is a phone number used by a courier, then the contact information for number B stored in the cloud contact list server may be provided as "courier number marked by 1000 people".

The contact information displaying unit 304 is configured to display the contact information.

In an embodiment of the present disclosure, after the contact information receiving unit 303 receives the contact information sent from the cloud contact list server, the contact information displaying unit 304 displays the contact information through a display unit of the mobile terminal, so that the user of the mobile terminal can know the contact information of the unknown number. For example, for number A and number B, the contact information displaying unit 304 may display the following contact information "a possible fraud phone call" and "a courier phone number marked by 1000 persons", respectively.

In an embodiment of the present disclosure, the contact information displaying unit 304 may not only display the contact information when receiving the calling request, but may also display the previously received contact information in a call list after the call conversation is finished.

The device based on the cloud contact list provided in the embodiments of the present disclosure may obtain the contact information corresponding to various phone numbers in the cloud contact list when receiving cold calls from unknown numbers, and then display the contact information to the user. Thus, the user can know the contact information of the unknown call number.

Figure 4:
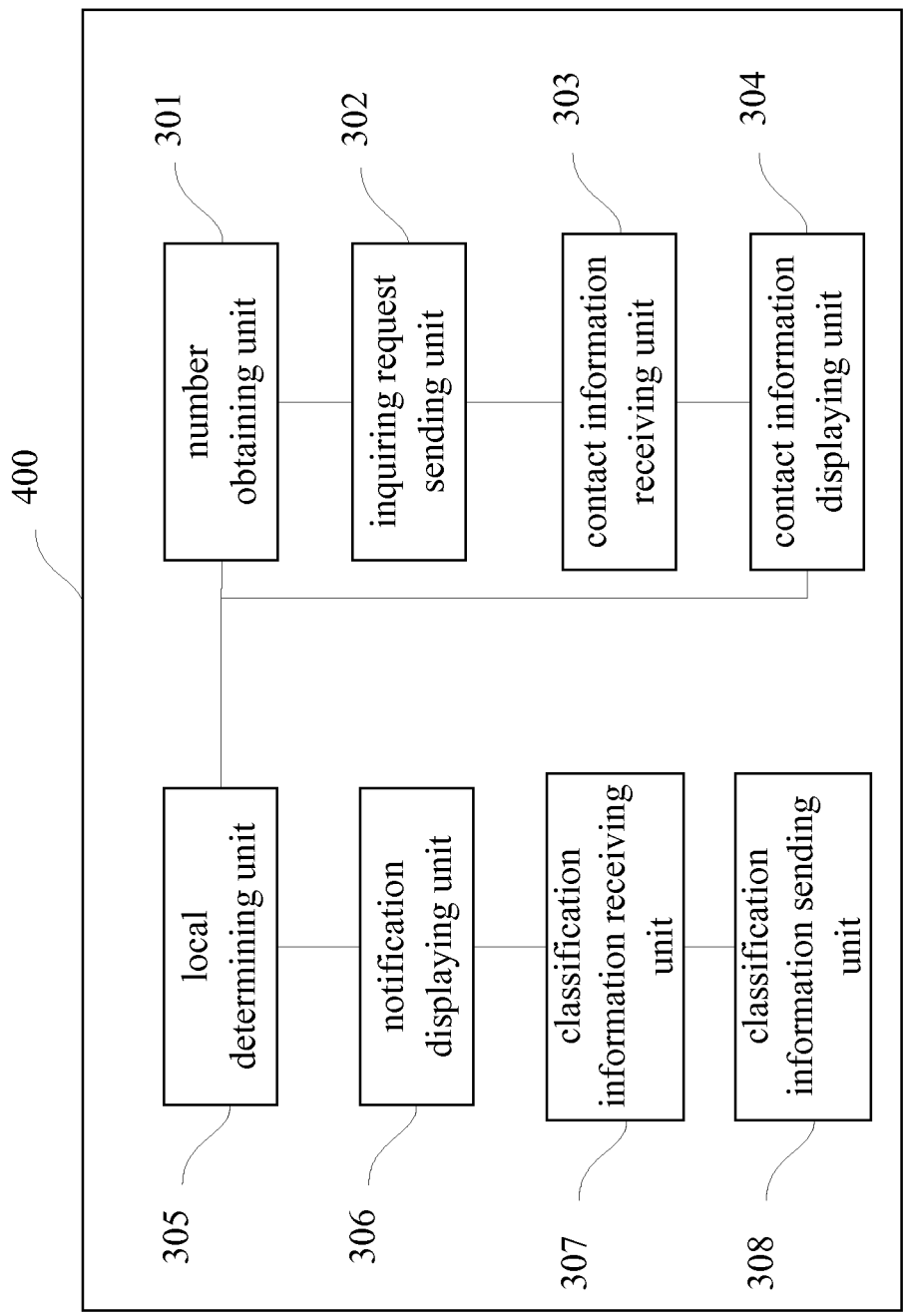
FIG. 4 is an exemplary block diagram showing a mobile terminal based on a cloud contact list according to an embodiment of the present disclosure.

FIG. 4 is an exemplary block diagram showing a calling device based on a cloud contact list according to an embodiment of the present disclosure. As shown in FIG. 4, the device based on a cloud contact list 400 includes a number obtaining unit 301, a request sending unit 302, a contact information receiving unit 303 and a contact information displaying unit 304, which are described in the embodiment with reference to FIG. 4. The device further includes: a local determining unit 305, a notification displaying unit 306, a classification information receiving unit 307 and a classification information sending unit 308.

The local determining unit 305 is configured to determine whether the contact information corresponding to the number information of the calling party is locally stored.

In an embodiment of the present disclosure, the number information of the calling party may be obtained according to a calling request from the calling party. The local judging unit 305 may determine whether the contact information corresponding to the number information of the calling party is locally stored, i.e., whether the number of the calling party is stored in the local contact list. If the contact information corresponding to the number information of the calling party is stored in the local contact list, the contact information displaying unit 304 may directly display the contact information.

The notification displaying unit 306 is configured to display the number recording notification if no contact information corresponding to the number information of the calling party is locally stored.

In an embodiment of the present disclosure, after the mobile terminal determines that the number of the calling party is an unknown number, i.e. not locally stored, the notification displaying unit 306 may display a number recording notification page having two buttons after the call conversation initiated by the calling request is finished. The two buttons are used to notify the user to store the unknown number in the local contact list or to mark it in the cloud contact list, respectively.

The classification information receiving unit 307 is configured to receive occupation classification information corresponding to the number of the calling party, which may be input by the user.

In an embodiment of the present disclosure, after the notification displaying unit 306 displays the number recording notification, the user may mark the unknown number by inputting information according to the call conservation with the calling party. The classification information receiving unit 307 then receives the occupation classification information, such as headhunter, insurance salesman, salesman, fraudster, food courier, express courier and so on.

The classification information sending unit 308 is configured to send the received occupation classification information to the cloud contact list server. In certain embodiments, the cloud contact list server may store a cloud contact list having a plurality of contact list entries. The server may update a contact list entry or add a new contact list entry according to the received occupation classification information.

The device based on the cloud contact list provided in the embodiments of the present disclosure may display notification information to notify the user to mark the unknown call number, and to upload the marked result to the cloud contact list server. Therefore, the cloud contact list server may obtain the contact information uploaded by various users.

Figure 5:
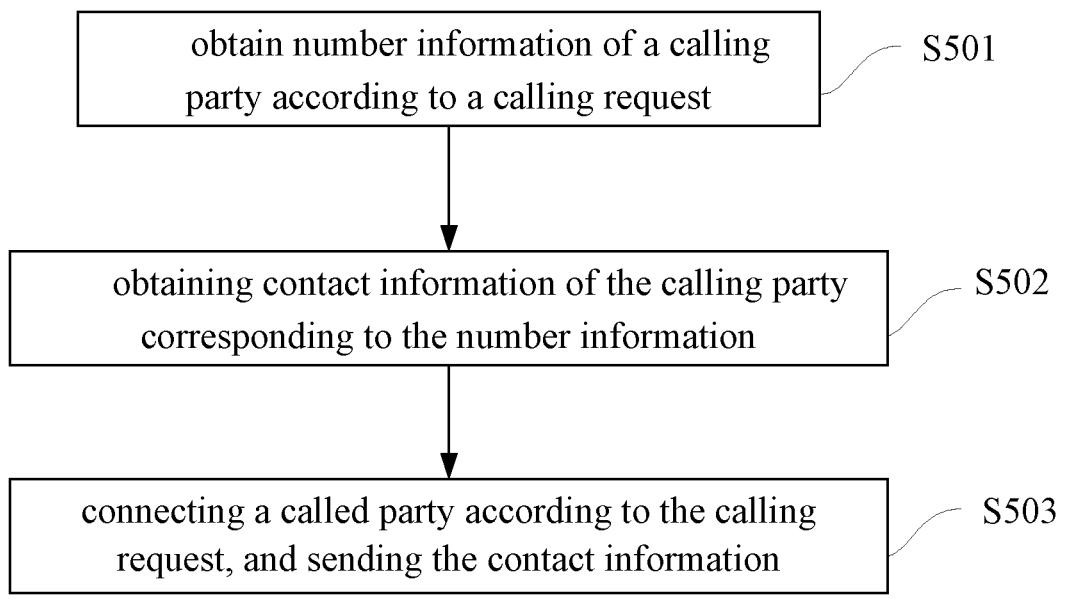
FIG. 5 is an exemplary flow chart showing a calling method based on a cloud contact list according to an embodiment of the present disclosure.

FIG. 5 is an exemplary flow chart showing a calling method based on a cloud contact list according to an embodiment of the present disclosure.

As shown in FIG. 5, the method starts from step S501, a cloud contact list server obtains number information of a calling party according to a calling request from the calling party.

In an embodiment of the present disclosure, the calling method based on the cloud contact list may be applied to the cloud contact list server such as a server managed by a telecommunication operator. The cloud contact list may be stored in the cloud contact list server or otherwise accessible by the cloud contact list server. For example, the cloud contact list may be stored within another server connected to and interactive with the cloud contact list server. The cloud contact list server may obtain the number information of the calling party according to the calling request when obtaining the calling request initiated by the calling party.

At step S502, the server obtains contact information of the calling party corresponding to the number information of the calling party.

In an embodiment of the present disclosure, the cloud contact list server searches in the cloud contact list for the corresponding contact information according to the obtained number information.

At step S503, the server connects a called party according to the calling request, and sends the contact information of the calling party to the called party.

In an embodiment of the present disclosure, after obtaining the contact information corresponding to the number information of the calling party, the cloud contact list server connects the called party, for example, according to a phone number of the called party included in the calling request. Then the server sends the contact information of the calling party to the called party.

The method based on the cloud contact list provided in the embodiments of the present disclosure may obtain the contact information corresponding to various phone numbers in the cloud contact list server when receiving cold calls from unknown numbers, and then send the contact information to the calling party during the connection of the calling party and called party. Thus, the called party can know the contact information of the unknown call number.

Figure 6:
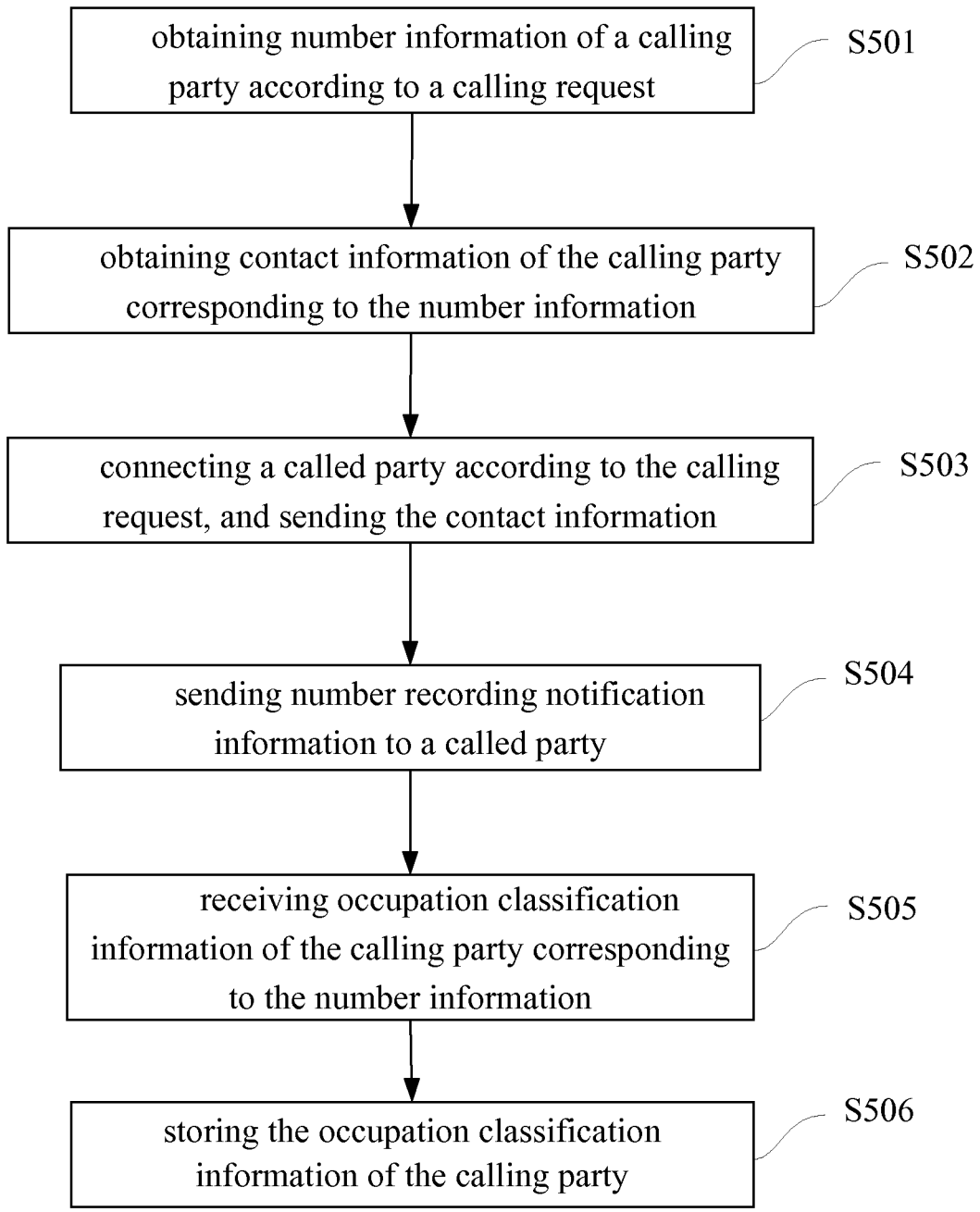
FIG. 6 is an exemplary flow chart showing a calling method based on a cloud contact list according to an embodiment of the present disclosure.

FIG. 6 is an exemplary flow chart showing a calling method based on a cloud contact list according to an embodiment of the present disclosure.

As shown in FIG. 6, the method includes the steps S501-S503 described in the embodiment with reference to FIG. 5. The method further includes the following steps:

At step S504, the cloud contact list server sends the number recording notification to the called party.

In an embodiment of the present disclosure, after the called party finishes the conversation with the calling party that initiates the call conversation, the cloud contact list server may send the number recording notification to notify the called party to record number information of the calling party.

At step S505, the server receives occupation classification information of the calling party corresponding to the number information of the calling party, which is sent from the called party.

In an embodiment of the present disclosure, after the called party marks the number information of the calling party, the mobile terminal of the called party may send the marked information to the cloud contact list server. And then the cloud contact list server may receive the occupation classification information corresponding to the number of the calling party.

S506, the server stores the occupation classification information of the calling party.

In an embodiment of the present disclosure, after receiving the occupation classification information corresponding to the number of the calling party, the cloud contact list server stores a relationship that correlates the number of the calling party with the occupation classification information of the calling party.

The calling method based on the cloud contact list provided by the embodiments of the present disclosure may send a notification to notify the called party to mark the unknown number after the conversation. Then the server may collect and classify the marked result uploaded by the user. In this way, the cloud contact list server may obtain the contact information uploaded by various users.

Figure 7:
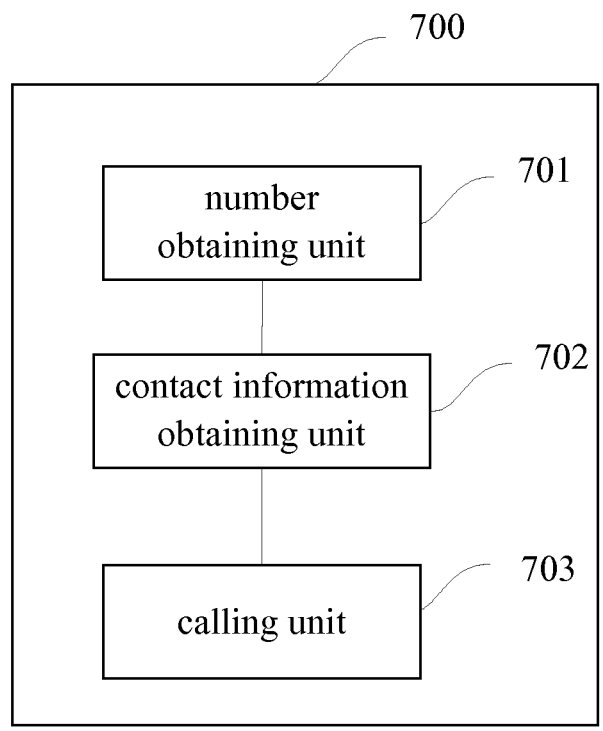
FIG. 7 is an exemplary block diagram showing a server based on a cloud contact list according to an embodiment of the present disclosure.

FIG. 7 is an exemplary block diagram showing a server based on a cloud contact list according to an embodiment of the present disclosure. As shown in FIG. 7, the server 700 includes a number information obtaining unit 701, a contact information obtaining unit 702 and a calling unit 703.

The number information obtaining unit 701 is configured to obtain number information of a calling party according to a calling request from the calling party.

In an embodiment of the present disclosure, when a cloud contact list server obtains the calling request initiated by the calling party, the number information obtaining unit 701 may obtain the number information related to the calling party according to the calling request.

The contact information obtaining unit 702 is configured to obtain contact information of the calling party according to the number information.

In an embodiment of the present disclosure, the contact information obtaining unit 702 searches in the cloud contact list server for the corresponding contact information according to the number information of the calling party obtained by the number information obtaining unit 701.

The calling unit 703 is configured to connect a called party according to the calling request, and send the contact information of the calling party to the called party.

In an embodiment of the present disclosure, after the contact information obtaining unit 702 obtains the contact information corresponding to the number information of the calling party, the calling unit 703 connects the called party, for example, according to the phone number of the called party included in the calling request. Then the calling unit 703 sends the contact information of the calling party to the called party.

The server based on the cloud contact list provided in the embodiments of the present disclosure may obtain the contact information corresponding to various phone numbers in the cloud contact list server when receiving cold calls from unknown numbers, and then send the contact information to the calling party during the connection of the calling party and called party. Thus, the called party can see the contact information of the unknown call number.

Figure 8:
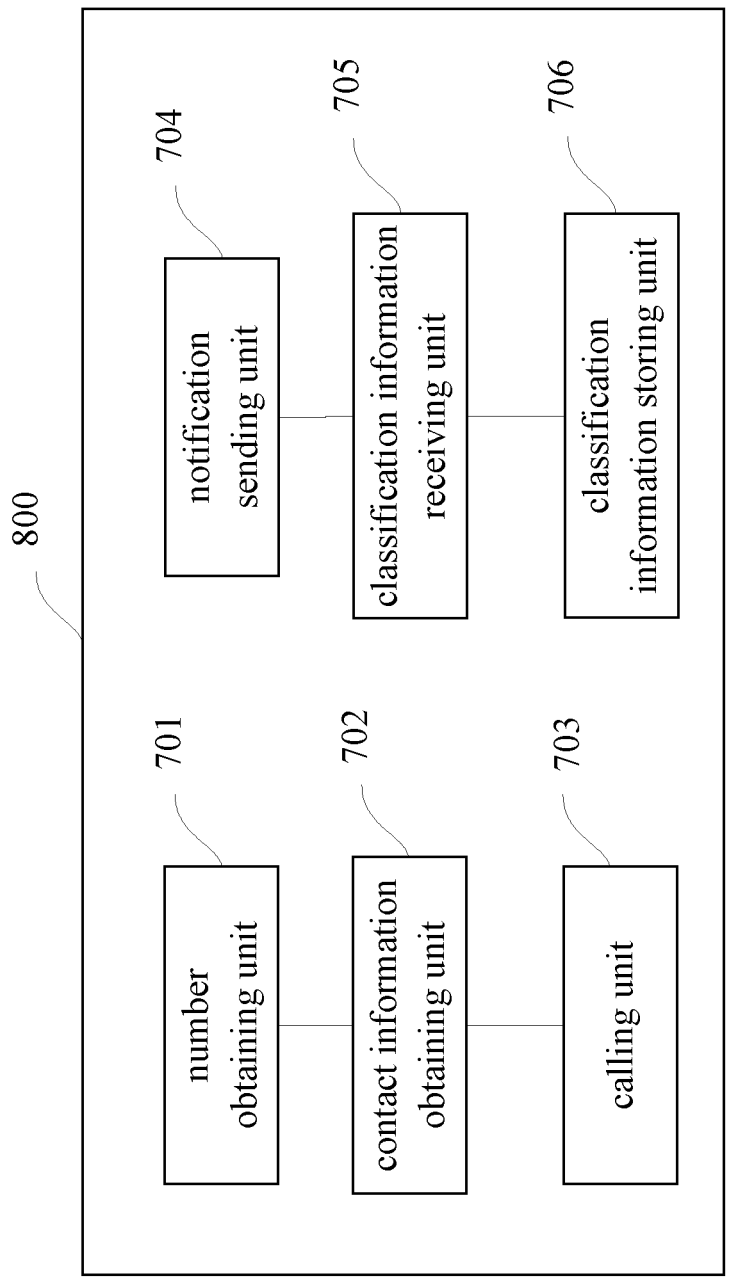
FIG. 8 is an exemplary block diagram showing a server based on a cloud contact list according to an embodiment of the present disclosure.

FIG. 8 is an exemplary block diagram showing a server based on a cloud contact list according to an embodiment of the present disclosure. As shown in FIG. 8, the server 800 includes a number information obtaining unit 701, a contact information obtaining unit 702 and a calling unit 703 described in the embodiment with reference to FIG. 7. The server 800 further includes: a number recording notification sending unit 704, a classification information receiving unit 705 and a classification information storing unit 706.

The number recording notification sending unit 704 is configured to send the number recording notification to the called party.

In an embodiment of the present disclosure, after the called party finishes the call conversation with the calling party that initiates the call conversation, the number recording notification sending unit 704 may send the number recording notification to notify the called party to mark the number information of the calling party.

The classification information receiving unit 705 is configured to receive occupation classification information corresponding to the number information of the calling party, which is sent from the called party.

In an embodiment of the present disclosure, after the called party marks the number information of the calling party, the mobile terminal of the called party may send the marked information to a cloud contact list server, and the classification information receiving unit 705 receives the occupation classification information corresponding to the number of the calling party.

The classification information storing unit 706 is configured to store the occupation classification information of the calling party.

In an embodiment of the present disclosure, after the classification information receiving unit 705 receives the occupation classification information of the calling party, which is sent from the called party, the classification information storing unit 706 stores a relationship that correlates the number information of the calling party with the occupation classification information of the calling party.

The device based on the cloud contact list provided in the embodiments of the present disclosure provide may, after the mobile terminal finishes the conversation, send a notification to notify the called party to mark the unknown number. Then the server may collect and classify the marked result uploaded by the user. In this way, the cloud contact list server may obtain the contact information uploaded by various users.

The mobile terminal described in the present disclosure may include various portable terminal devices such as a mobile phone, a personal digital assistant (PDA), a messaging device and the like. Therefore, the scope of the present disclosure is not limited to a certain type of mobile terminal.

The mobile terminal includes one or more processors, such as a computer processor or microprocessor as known in the industry to receive various data, programs and instructions, and to process such data, programs and instructions accordingly. The mobile terminal may also include a memory which is coupled to the one or more processors and is configured to store the data, programs and instructions to be processed by the processors.

Furthermore, the mobile terminal may further include input modules, such as a touch screen, a keyboard, a mouse or the like to receive requests and inputs from the user. These are not described in details as they would be readily apparent to those skilled in the art.

In addition, the above steps in the methods and the units may be implemented by a processor and a computer readable recording medium configured to store the computer programs for the processor to perform the above steps or the functions of the units.

In addition, it should be understood that, the computer readable recording medium (for example, a memory) described in the present disclosure may be a transitory memory or a non-transitory memory, or may comprise both of the transitory memory and the non-transitory memory. As an example and not for limitation, the non-transitory memory may comprise a read-only memory (ROM), a programmable ROM (PROM), an electrically programmable ROM (EPROM), an electrically erasable programmable ROM (EEPROM) or a flash memory. The transitory memory may comprise a random access memory (RAM), and the RAM may function as an external cache memory. As an example and not for limitation, the RAM may be obtained in various kinds such as a synchronous RAM(DRAM), a dynamic RAM (DRAM), a synchronous DRAM (SDRAM), a double data rate SDRAM (DDR SDRAM), an enhanced SDRAM (ES-DRAM), a synchronous link DRAM (SLDRAM) and a directly Rambus RAM (DRRAM). The storage device in the disclosed aspect intends to comprise but not to be limited to these and other proper types of memories.

It should be understood by those skilled in the art that, the various exemplary logic blocks, modules, circuits and algorithm steps described in conjunction with the disclosure herein may be implemented by electronic hardware, computer software or the combination of both. In order to clearly explain the interchangeability of the hardware and the software, it has been generally illustrated with respect to the functions of the various exemplary members, blocks, modules, circuits and steps. Whether such functions are implemented by software or hardware depends on specific applications and design restrictions applied to the whole system. Those skilled in the art may realize the functions in many ways for respective specific applications, but such realizations may not be explained as departing from the scope of the present disclosure.

By using the following components designed to execute the functions described herein, the various exemplary logic blocks, modules and circuits described in conjunction with the disclosure herein may be carried out or executed: a general-purpose processor, a digital signal processor (DSP), a specific integrated circuit (ASIC), a field programmable gate array (FPGA) or other programmable logic devices, a discrete gate or transistor logic, a discrete hardware assemble or any combination of these components. The general-purpose processor may be a microprocessor. However, alternatively, the processor may be any of traditional processors, processors, microprocessors or state machines. The processor may also be implemented as a combination of computing devices such as a combination of a DSP and a microprocessor, a plurality of microprocessors, one or more microprocessors combined with a DSP core chip, or any other these kinds of configurations.

The method or algorithm steps described in conjunction with the disclosure herein may be directly included in hardware, in software modules executed by the processor or in the combination of both. The software modules may host in a RAM memory, a flash memory, a ROM memory, an EPROM memory, an EEPROM memory, a register, a hard disc, a movable disc, a CD-ROM, or any of other kinds of storage medium known in the art. The exemplary storage medium is coupled to the processor, so that the processor can read/write information from/to the storage medium. In an alternative aspect, the storage medium may be integrated with the processor. The processor and the storage medium may host in an ASIC. The ASIC may host in a user terminal. In an alternative aspect, the processor and the storage medium may host in a user terminal as a discrete assembly.

In one or more exemplary designs, the functions may be implemented in hardware, software, firmware or any combinations thereof. If it is implemented in software, the function may be stored as one or more instructions or codes in the computer readable medium or transferred via the computer readable medium. The computer readable medium comprises a computer storage medium and a communication medium, wherein the communication medium comprises any medium which is helpful for transferring the computer program from one site to another site. The storage medium may be any usable medium able to be accessed by a general or dedicated computer. As an example and not for limitation, the computer readable medium may comprise a RAM, a ROM, an EEPROM, a CD-ROM or other CD storage devices, a disc storage devices or other magnetic storage devices, or may be any other medium for carrying or storing the required program code in form of instructions or data structure and able to be accessed by a general or dedicated computer or a general or dedicated processor. In addition, any kind of connection may be properly referred as a computer readable medium. For example, if software is sent from a website, a server or other distant sources by using a coaxial cable, an optical fiber cable, a twisted-pair, a digital user line (DSL) or using wireless technology such as infrared, radio and microwave, the above coaxial cable, optical fiber cable, twisted-pair, DSL or the wireless technology such as infrared, radio and microwave are all included in the definition of medium. As used herein, the disc and CD comprise a compact disc (CD), a laser disc, an optical disc, a digital versatile disc (DVD), a floppy disc or a blue-ray disc, wherein the magnetic disk usually reproduces data magnetically, and the optical disc usually reproduces data optically by using laser. The combination of the above components may also be included in the scope of the computer readable medium.

Although the exemplary embodiments of the present disclosure are illustrated in the contents of the present disclosure as above, it should be note that various variations and modifications may be available without departing from the scope of the present disclosure defined by the claims. According to the functions of the method claims in the disclosed embodiments described herein, steps and/or actions are executed without in any specific sequence. In addition, although any element in the present disclosure may be described or required individually, it may be conceived as plural, unless being clearly defined as single.

It should be understood that, the above-described specific embodiments illustrate the objects, technical solutions and benefit effects of the present disclosure in detail, which is for illustrating the embodiments of the present disclosure other than limiting the scope of the present disclosure. Various modifications, equivalent substitutions and improvement can be made to the present disclosure without departing from the spirit or scope of the present disclosure.

What is claimed is:

1. A calling method at a mobile terminal of a called party, comprising:
   obtaining number information of a calling party according to a calling request from the calling party;
   determining whether contact information corresponding to the number information of the calling party is locally stored;
   displaying the contact information if the contact information corresponding to the number information of the calling party is locally stored;
   sending an inquiry request to a cloud contact list server according to the number information of the calling party, if no contact information corresponding to the number information of the calling party is locally stored;
   receiving the contact information corresponding to the number information of the calling party from the cloud contact list server;
   displaying the contact information corresponding to the number information of the calling party;
   displaying a number recording notification for prompting the called party to input information for marking the calling party; and
   inputting occupation classification information corresponding to the number information of the calling party from the called party, in response to the number recording notification.

2. The calling method according to claim 1, wherein the occupation classification information is inputted by the called party according to call conversation with the calling party.

3. The calling method according to claim 2, wherein the method further comprises:
   sending the inputted occupation classification information to a cloud contact list server for updating contact information stored in the cloud contact list server.

4. A mobile terminal of a called party, comprising:
   a processor; and
   a memory coupled to the processor;
   wherein the processor is configured to execute steps comprising:
   obtaining number information of a calling party according to a calling request from the calling party;
   determining whether contact information corresponding to the number information of the calling party is locally stored;
   displaying the contact information if the contact information corresponding to the number information of the calling party is locally stored;
   sending an inquiry request to a cloud contact list server according to the number information of the calling party, if no contact information corresponding to the number information of the calling party is locally stored;
   receiving the contact information corresponding to the number information of the calling party from the cloud contact list server;
   displaying the contact information corresponding to the number information of the calling party;
   displaying a number recording notification for prompting the called party to input information for marking the calling party; and
   inputting occupation classification information corresponding to the number information of the calling party from the called party, in response to the number recording notification.

5. The mobile terminal according to claim 4, wherein the occupation classification information is inputted by the called party according to call conversation with the calling party.

6. The mobile terminal according to claim 5, wherein the processor is further configured to execute steps comprising:
   sending the inputted occupation classification information to the cloud contact list server for updating contact information stored in the cloud contact list server.

7. A calling method at a server, comprising:
   obtaining number information of a calling party according to a calling request from the calling party;
   connecting a called party with the calling party according to the calling request;
   receiving, from the called party, an inquiry request corresponding to the number information of the calling party;
   sending, to the called party, contact information corresponding to the number information of the calling party;
   sending a number recording notification to the called party for prompting the called party to input information for marking the calling party;
   receiving occupation classification information corresponding to the number information of the calling party from the called party; and
   storing the occupation classification information for updating contact information corresponding to the number information of the calling party,
   wherein the occupation classification information is inputted by the called party to mark the calling party, in response to the number recording notification.

8. The calling method according claim 7, wherein the occupation classification information is inputted by the called party according to call conversation with the calling party.

9. A server, comprising:
   a processor; and
   a memory coupled to the processor;
   wherein the processor is configured to execute steps comprising:
   obtaining number information of a calling party according to a calling request from the calling party;
   connecting a called party with the calling party according to the calling request;
   receiving, from the called party, an inquiry request corresponding to the number information of the calling party;
   sending, to the called party, contact information corresponding to the number information of the calling party;
   sending a number recording notification to the called party for prompting the called party to input information for marking the calling party;
   receiving occupation classification information corresponding to the number information of the calling party from the called party; and
   storing the occupation classification information for updating contact information corresponding to the number information of the calling party,
   wherein the occupation classification information is inputted by the called party to mark the calling party, in response to the number recording notification.

10. The server according claim 9, wherein the occupation classification information is inputted by the called party according to call conversation with the calling party.

* * * * *